United States Patent
Libreri et al.

(10) Patent No.: US 9,280,034 B2
(45) Date of Patent: Mar. 8, 2016

(54) DYNAMIC LIGHTING

(71) Applicant: LUCASFILM ENTERTAINMENT COMPANY LTD., San Francisco, CA (US)

(72) Inventors: Kimberley Sean Libreri, Fairfax, CA (US); Curt Isamu Miyashiro, Walnut Creek, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 286 days.

(21) Appl. No.: 14/019,402

(22) Filed: Sep. 5, 2013

(65) Prior Publication Data
US 2015/0062863 A1   Mar. 5, 2015

(51) Int. Cl.
| G03B 15/02 | (2006.01) |
| H04N 5/225 | (2006.01) |
| H04N 5/235 | (2006.01) |
| H04N 5/222 | (2006.01) |

(52) U.S. Cl.
CPC ............ *G03B 15/02* (2013.01); *H04N 5/222* (2013.01); *H04N 5/2256* (2013.01); *H04N 5/2354* (2013.01); *H04N 5/2356* (2013.01)

(58) Field of Classification Search
CPC . H04N 19/177; H04N 5/2256; H04N 5/2354; G03B 15/02
USPC ............. 348/370, 371; 362/11, 14; 396/4
See application file for complete search history.

(56) References Cited

U.S. PATENT DOCUMENTS

| 6,545,742 B2 * | 4/2003 | O'Hagan ............... 352/199 |
| 6,685,326 B2 * | 2/2004 | Debevec et al. .......... 362/11 |
| 8,994,876 B2 * | 3/2015 | Spielberg .............. 348/370 |
| 2009/0232418 A1 * | 9/2009 | Lolacono et al. ........ 382/312 |
| 2011/0242334 A1 * | 10/2011 | Wilburn et al. ......... 348/207.1 |
| 2013/0083997 A1 * | 4/2013 | Matthews ............. 382/164 |
| 2013/0176481 A1 * | 7/2013 | Holmes et al. .......... 348/370 |
| 2014/0198219 A1 * | 7/2014 | Chuang et al. .......... 348/164 |
| 2014/0313401 A1 * | 10/2014 | Rihn et al. ............ 348/371 |

* cited by examiner

*Primary Examiner* — William C Dowling
(74) *Attorney, Agent, or Firm* — Kilpatrick Townsend & Stockton LLP

(57) ABSTRACT

A movie set can include light sources each producing a light corresponding to a light channel, at least one high-frame rate camera, and a controller connected to the light sources and camera to synchronize the camera and light sources. The number of light channels can be proportional to the frame rate. For example, if the filming frame rate is 120 frames per second (fps) and the playback frame rate is 24 fps, then 5 light channels can be used. In this example, for every one playback frame, 5 frames were filmed by the high frame rate camera. The controller modulates the light channels such that each of the 5 frames has different lighting characteristics. In post-production, contributions from each of the light channels can be included or excluded from the final frame. An optical flow algorithm can be used to stitch together frames with different dynamic light characteristics.

20 Claims, 7 Drawing Sheets

DYNAMIC LIGHTING

BACKGROUND

The present disclosure relates generally to dynamic light and more specifically to dynamic lighting for capturing motion content for visual media, including films, television programs, gaming, and other visual media.

Traditionally, multiple time-consuming manual setups are required to capture the desired lighting, facial expressions, and/or subject movement on a stage for a particular scene. For example, a Director of Photography (DP) or other person with creative input into scene lighting may spend hours placing lights and setting the desirable intensity, color, and quality on each of them to get the desired aesthetic effect. The DP would then shoot the scene with the various characteristics of the light baked into the final image (intensity, color, quality) that is recorded. This methodology gives the DP very little flexibility to modify the scenes qualities after it has been shot with a camera. During post-production, if the DP or others wanted to change the balance or intensity of lighting, this would be very difficult to achieve without major expense and time.

Embodiments of the invention address these and other problems both individually and collectively.

SUMMARY

The dynamic lighting approach of the present invention allows the DP or others to efficiently and flexibly modify the quality of light in a frame after the scene is captured. In some embodiments of the present invention, the final frame would be represented by a composite of N-light channels. A channel represents a light or a grouping of lights that contribute to the total aesthetic look of the final frame. If the DP or others wanted to modify the lighting, they could select any one of the N channels, and then alter the intensity of the channel, change the color of the channel, apply specialized effects to the channel, change the quality, and/or mix-and-match various channels' contributions to the final frame.

In some embodiments, the present approach uses high frame rate photography to capture the channels and, with the addition of optical flow techniques, allows one to combine the N discrete light channels into a single final frame reflecting the desired final contribution of the individual N channels. In some embodiments, a digital motion picture camera rolling at a high frame rate can capture N channels of luminance from different lighting sources. Each light source, whether fill, key, point or the like, can be synchronized to expose on one of the N channels (i.e., frames) during acquisition. This results in N potential light sources that can be modified in post-production and played back at a cinematic frame rate.

In one use case, a scene to be filmed can include a plurality of lights each contributing a lighting component to the final frame (e.g., a key light, a fill light, an ambient light, etc.) producing light corresponding to a light channel (e.g., 5 light channels), at least one camera running at a high frame rate (e.g., 120 frames per second), and a controller coupled to the lights and camera through a wired or wireless communication, which synchronizes the lights with the camera so each of the 5 light channels captures only the desired light component in the channel (e.g., channel 1 would capture the key light, channel 2 the fill light, etc.). The number of light channels can be proportional to the frame rate. For example, if the filming frame rate is 120 fps and the playback frame rate is 24 fps, then 5 light channels can be used (120/24=5). In this example, for every one playback frame, 5 frames were filmed by the increased frame rate camera. The controller modulates the light channels such that each of the 5 frames has different lighting characteristics (e.g., one light is captured for each of the 5 light channels). In post-production, desired characteristics of each of the 5 light channels may be selected and undesirable characteristics can be excluded. An optical flow algorithm can be used to stitch together frames, compensating for the fact that there may be slight differences within the 5 channels due to changes in the frames, to produce a final sharp image.

These and other embodiments will be described in more detail below.

DETAILED DESCRIPTION

Figure 1:
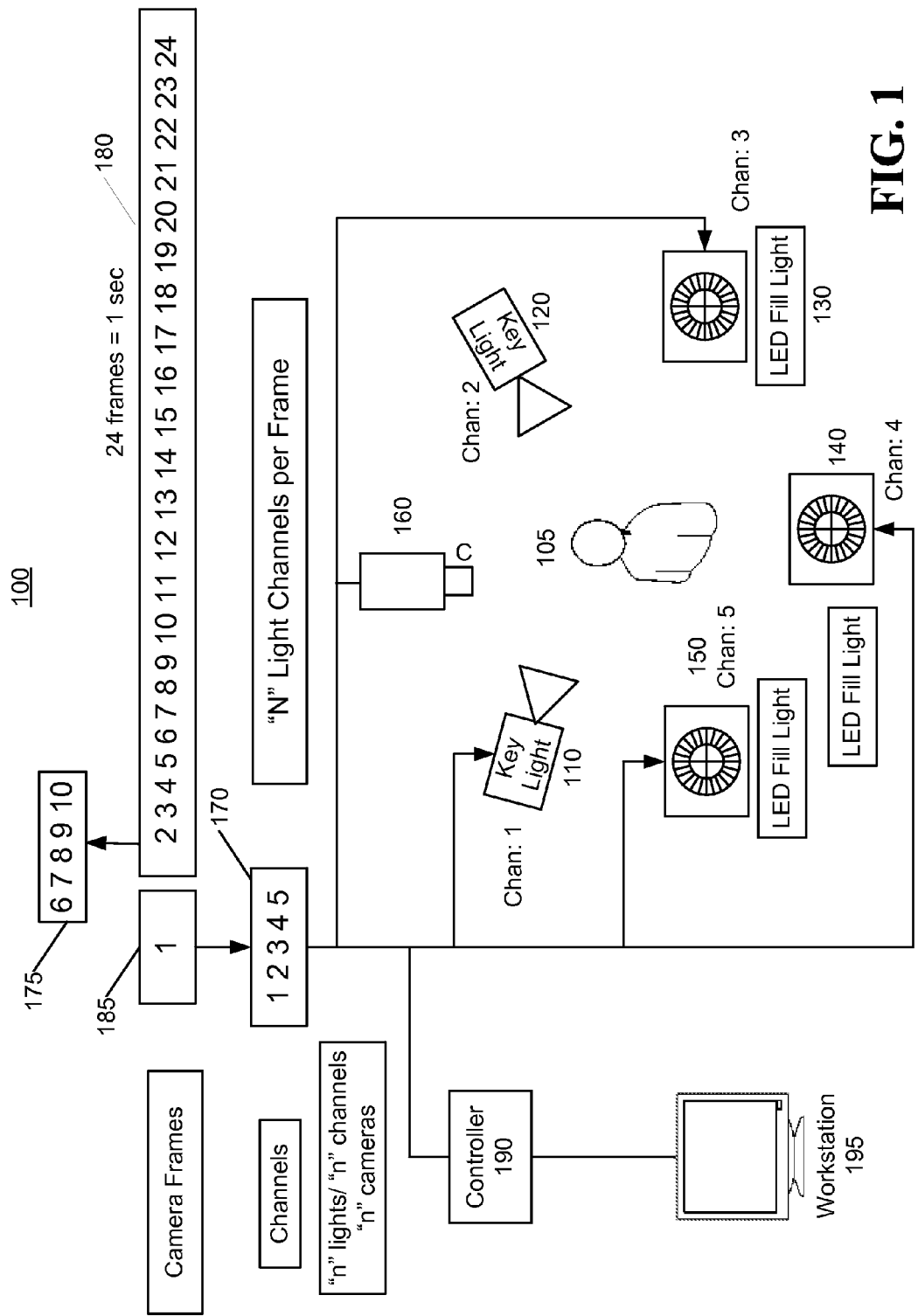
FIG. 1 illustrates a lighting and filming system in accordance with an embodiment of the present invention.

Directors of Photography (DP), Directors, and other Artists have a specific vision in mind for the desired cinematographic output of their work. In post-production, visual effects, computer-generated imagery (CGI), and other tools can be used to achieve the desired visual appearance. Often these tools are not readily accessible on a movie set or due to limitations in the tools, and the desired visual appearance, often cannot be achieved without having to reshoot the entire scene. It can be beneficial to make some of these post-production processes and other tools more accessible to the DP and Directors on a movie set. After a scene is shot, it can be beneficial in post-production to be able to modify lighting qualities without having to reshoot the scene and/or shoot the scene multiple times using varying lighting scenarios.

The dynamic lighting approach of the present disclosure can reduce the amount of post-production processing to capture the desired cinematographic output. This can allow the desired cinematographic output to be captured more efficiently in terms of time and cost to production. By placing a predetermined number of lights, an entire scene or shot can be captured with the lights, allowing one to adjust the contribution of the lights to the final frame. In post-production, the intensity, color, and other characteristics of those individual lights can be manipulated to achieve the desired vision of the Director or DP. Embodiments of the present invention allow the DP to change the light color, light intensity, or other desired light qualities at a later time—days, weeks, or months after the scene was filmed. Embodiments of the present invention also simplify the setup process on set so that the DP or Director does not have to make all the lighting choices at the time of the shoot. Instead, using embodiments of the inventions, the DP merely has to position the lights at the desired locations with approximately the desired color, intensity, etc. at the shoot, and the levels, colors, and other qualities can be adjusted later. Using prior techniques, when in post-production, if the DP or others wanted to change the balance or intensity of lighting after the fact, for example, it would be a major expense and likely result in significant time lost in post-production.

The present approach can use high frame rate photography to capture light contributions for various light channels and, with optical flow techniques, allow artists to modify and combine the light channels to achieve the desired cinematographic output. Frame rate (frequency) is the rate at which an imaging device produces distinct consecutive images called frames. Movies are created by taking a rapid sequence of images (frames) of action. By displaying these frames consecutively in rapid succession, the illusion of motion can be created. "Frame rate" is the number of frames captured or projected per second. Frame rate can be expressed in frames per second (fps). Most modern motion pictures are played at 24 fps; however, others are possible (25 fps, 30 fps, etc.).

The frame rate at which a motion picture is played back (or displayed) on a screen can be referred to as the "playback frame rate." The frame rate at which a motion picture is filmed or captured can be referred to as the "filming frame rate" or "capture frame rate." "High frame rate" refers to a frame rate that is faster (i.e., has a higher frame rate) than the playback frame rate. Typically, in the context of the present invention, the capture frame rate is at least twice as large as the playback frame rate for reasons that will be described below. As described above, a typical playback frame rate is 24 fps; so a capture frame rate could be, for example, 120 fps (a frame rate 5 times the playback frame rate). The present invention also contemplates much higher capture frame rates, including 240 fps, 360 fps, 5K fps, 10K fps, and the like.

A stage can include a plurality of lights, each producing a light corresponding to a light channel (e.g., 5 light channels), at least one high-frame rate camera (e.g., 120 frames per second), and a controller synchronizing the lights and camera. The number of light channels can be proportional to the frame rate. For example, if the filming frame rate is 120 fps and the playback frame rate is 24 fps, then 5 light channels can be used (120/24=5). In this example, for every one playback frame, 5 frames were filmed by the increased frame rate camera. The controller modulates the light channels such that each of the 5 frames has different lighting characteristics. In post-production, desired characteristics of each of the 5 frames may be selected and undesirable characteristics can be excluded. An optical flow algorithm can be used to stitch together frames with different dynamic light characteristics to produce a final frame that would be played back at 24 fps, for example.

I. Overview of Dynamic Lighting System and Method

FIG. 1 illustrates a system 100 according to an embodiment of the invention, for capturing motion images of a subject 105. System 100 can include a light stage with a plurality of light sources (e.g., 110, 120, 130, 140, and 150) each producing a light corresponding to a light channel (e.g., light channels 1-5). One or more cameras may be used to capture motion picture frames of subject 105. A controller 190 can be used to control and synchronize the lights and camera. A workstation 195 can provide real-time visual feedback of the images captured by the camera.

Subject 105 can be a person or any object, a movie set within a field of view, or any number of persons or objects. In some embodiments, the subject may be moving from one part of a viewable area to another part of the viewable area and/or changing orientation within the same general part of the viewable area. Movement, changes in orientation, and the like can occur at a high or low rate of change. In general, the higher the rate of change, the more likely it is for blurring to occur.

Light sources 110, 120, 130, 140, and 150 can produce a light for a given light channel, as illustrated, light channels 1, light channel 2, light channel 3, light channel 4, and light channel 5. For purposes of simplicity, a 5-light channel system is described here. Any suitable number of lights and channels may be used without departing from the scope of the present invention. As described further below, the number of lights and light channels can be increased in proportion with the capture frame rate.

Light sources 110, 120, 130, 140, and 150 can use any suitable light source. Suitable light sources include key lights, point lights, fill lights, back lights, and the like. A fill light can be used to reduce the contrast of a scene and can provide illumination for the areas of the image that are in shadow. Fill light is often uniform and less intense than the key light and can be used to provide a uniform light over a person or a set. A key light can be focused or diffused, and depending on the desired setup the key lights can be placed at different angles relative to subject 105.

In some embodiments, light channels can be used for illuminating a subject, objects, or background. In some embodiments, one or more of the N light channels could be used for other purposes other than just illuminating a subject. For example, light channels could project a blue or green screen behind the subject. In other cases, light channels can project patterns, noise, or other effects to aid in the post-production process. The patterns, noise, or other effects could be Projected either on the environment surrounding the subject or the subject itself.

Camera 160 can be any suitable modern digital camera that captures content at a high frame rate. Modern motion picture cameras can shoot at increasingly high frame rates; however, the present invention is not limited to high frame rate cameras currently in use. Embodiments of the present invention contemplate extremely high frame rate capture that is not available at present day. For example, currently, a Sony F65 digital motion picture camera could be used, which can capture 60 frames per second (fps) at 4K resolution or 120 fps at 2K resolution. Any suitable camera could be used and this is merely an example of a suitable, commercially available camera. Some cameras in current use can capture 5,000 fps or more.

In some embodiments, multiple cameras can be used to capture different angles. For example, the artist may want a close-up face shot of an actor and then a full mid-shot of the actor. Multiple cameras capturing footage simultaneously can be used. In a multiple camera setup, each of the cameras can shoot at a high frame rate and can be synchronized to the light channels in a similar manner as described herein.

Controller 190 can be used to synchronize the light channels and camera 160. Workstation 195 can be used to provide real-time feedback to the artists on the set. Workstation 195 can include input-output (e.g., monitor and keyboard) and a mixer that can be used to adjust the lights for each light channel. For example, for a given light channel, the intensity, luminosity, colorization, and the like can be modified right there on the set based on instant feedback.

FIG. 1 also shows several frame sequences that are captured by the cameras and/or played back at a later time. Captured frames 170 and 175 are captured at a capture frame rate. The capture frame rate is a high frame rate, such as 120 fps, 240 fps, etc. Playback frames 180 are played back at a playback frame rate. The playback frame rate can be any conventional frame rate for viewing motion pictures, such as 24 fps, 25 fps, 30 fps, etc. As will be described in more detail below, the multiple frames of the captured frames 170 can correspond to one of the frames from the playback frames 180. In system 100, for example, the capture frame rate is 120 fps and the playback frame rate is 24 fps (e.g., cinematic frame rate). Therefore, for every 5 frames that are captured by camera 160, there is one playback frame. For example, playback frame 1 (185) may correspond to five frames (frames 1, 2, 3, 4, and 5, of captured frames 170). Playback frame 2 may correspond to the next five captured frames (frames 6, 7, 8, 9, and 10 of capture frames 175). Frame 3 may correspond to one or more of the next five capture frames 11-15 (not shown). These concepts are described in more detail below.

Figure 2:
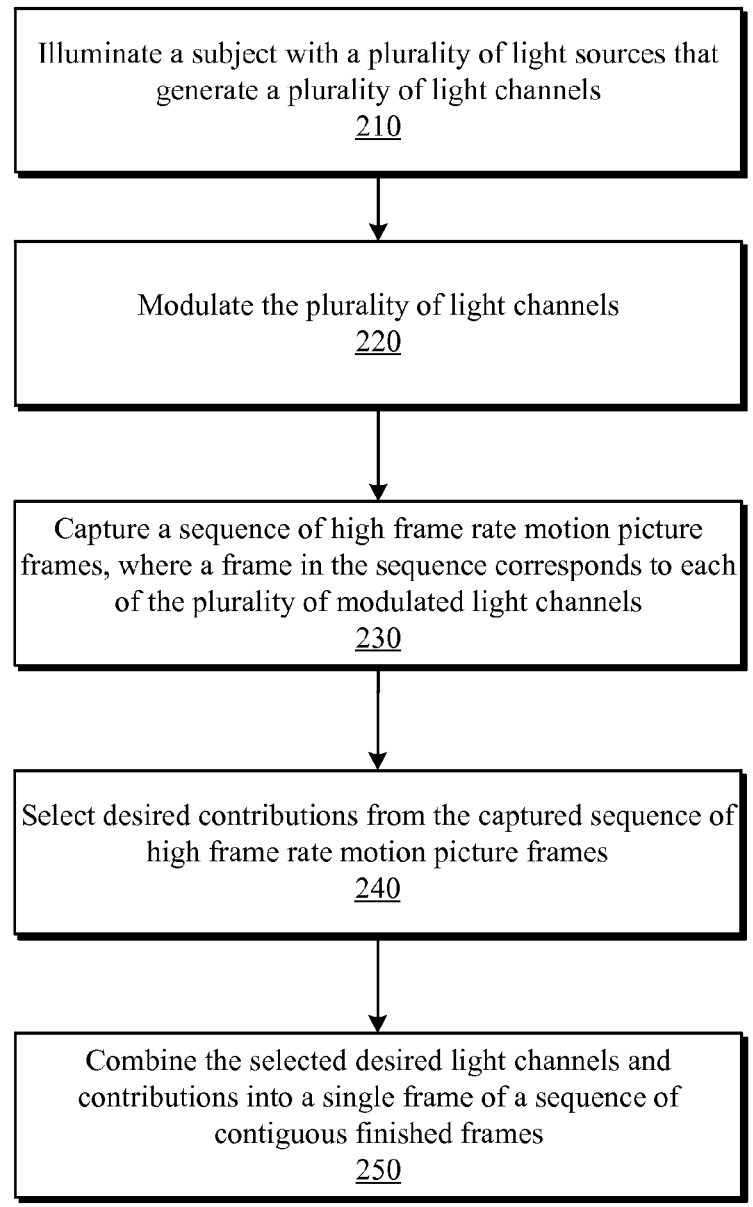
FIG. 2 illustrates a high-level process for capturing motion picture images with various light levels and combining images in accordance with an embodiment of the present invention.

Now that a high-level description of system 100 has been provided, we now turn to an exemplary method. FIG. 2 is a high-level flow diagram according to an embodiment of the invention. At block 210, subject 105 can be illuminated with a plurality of light sources (e.g., 110, 120, 130, 140, and 150) that generate a plurality of light channels. The light sources may be provided on a light stage.

At block 220, the light channels can be modulated so that different light is being shone on subject 105 at different times. For example, at a first time, subject 105 can be illuminated with light channel 1, while the other light channels remain off (channels 2-5); at a second time, subject 105 can be illuminated with light channel 2, while the other light channels remain off (channels 1, 3-5); and so on. In some embodiments, the switching between the various light channels occurs at a rate that is proportional to the ratio between the playback frame rate and the capture frame rate. In some embodiments, the switching between the various light channels occurs at a rate that is directly proportional to the ratio between the playback frame rate and the capture frame rate.

In some embodiments, the modulation between light channels occurs very rapidly (e.g., $\frac{1}{48}$ of a second, $\frac{1}{60}$ of a second, $\frac{1}{120}$ of a second, or $\frac{1}{240}$ of a second). When the light is modulated at a rapid pace, the light on stage may appear like a uniform "white light" since the human eye perceives all of the light channels illuminating the subject nearly simultaneously. In this instance, workstation 195 can be useful to the Director or DP so that they can isolate the illumination provided by the individual light channels. This makes real-time adjustments of the light levels of particular light channels possible. It is also possible that, when the light is modulated at a rapid pace, a flicker may be perceptible on set or it may be imperceptible to the human eye.

At block 230, a camera (e.g., 160) captures frames at a high rate (e.g., 120 fps, 240 fps, 5,000 fps, etc.). In one embodiment, the capture frame rate is the playback frame rate multiplied by the number of light channels. In one embodiment, a digital motion picture camera rolls at a high frame rate to capture N channels of luminance from different lighting sources. Each light source can be synchronized to expose on one of the N channels (i.e., frames) during acquisition. This will result in N potential light sources that can be modified in post and played back at the playback frame rate (e.g., cinematic frame rate of 24 fps).

For example, rolling at 120 frames per second, the camera could capture 5 channels (e.g., from 5 light different sources). In this example, captured frames 1, 2, 3, 4, and 5 would be illuminated by light channel 1, channel 2, channel 3, channel 4, and channel 5, respectively. Likewise, captured frames 6, 7, 8, 9, and 10 would be illuminated by light channel 1, channel 2, channel 3, channel 4, and channel 5, respectively. That is, captured frame 1 (as well as captured frame 6, 11, and so on) would be illuminated by channel 1 light sources and not by light sources for channels 2-5. Likewise, captured frame 5 (as well as captured frames 10, 15, 20, and so on) would be illuminated by channel 5 light sources and not by light sources for channels 1-4. In this example, captured frames 1-5, 6-10, 11-15, and so on each capture a cycle of differing light provided by each of the light channels. A controller (e.g., 190) that controls a strobing device can turn various light sources on and off in order to create the cycle of lighting (e.g., a light source cycling through light sources 1-2-3-4-5-1-2-3-4-5, and so on, in unison with the high frame capture sequence of the camera). In this example, every five frames, the system would cycle through all five of the light sources provided by the light channels.

In some embodiments, blocks 210, 220, and 230 represents the motion picture capture process. Further details of the motion picture capture process are described with reference to FIG. 3, below. In some embodiments, information collected from any one of the N-channels may be combined with other Z-depth data (e.g., lasers or infrared) to help augment the information captured in the channel.

At block 240, desired contributions are selected from the high frame rate captured footage. For example, if the DP or others wanted to modify the lighting, the DP could select any one of the lights channels, and modify the light effect from that particular light channel. For example, the DP could alter the intensity, change the color, and apply specialized effects. Block 240 can occur after footage has been captured in post-production or in real-time on the set using the workstation described herein.

At block 250, the selected desired light channels and/or contributions from those light channels can be combined into a single frame of a sequence of contiguous finished frames. For example, the DP could mix-and-match various contributions from differing light channels to create the final frame.

In some embodiments, blocks 240 and 250 represent an editing process. Further details of the editing process are described with reference to FIGS. 4 and 5, below.

II. Frame Capture with Dynamic Lighting

Figure 3:
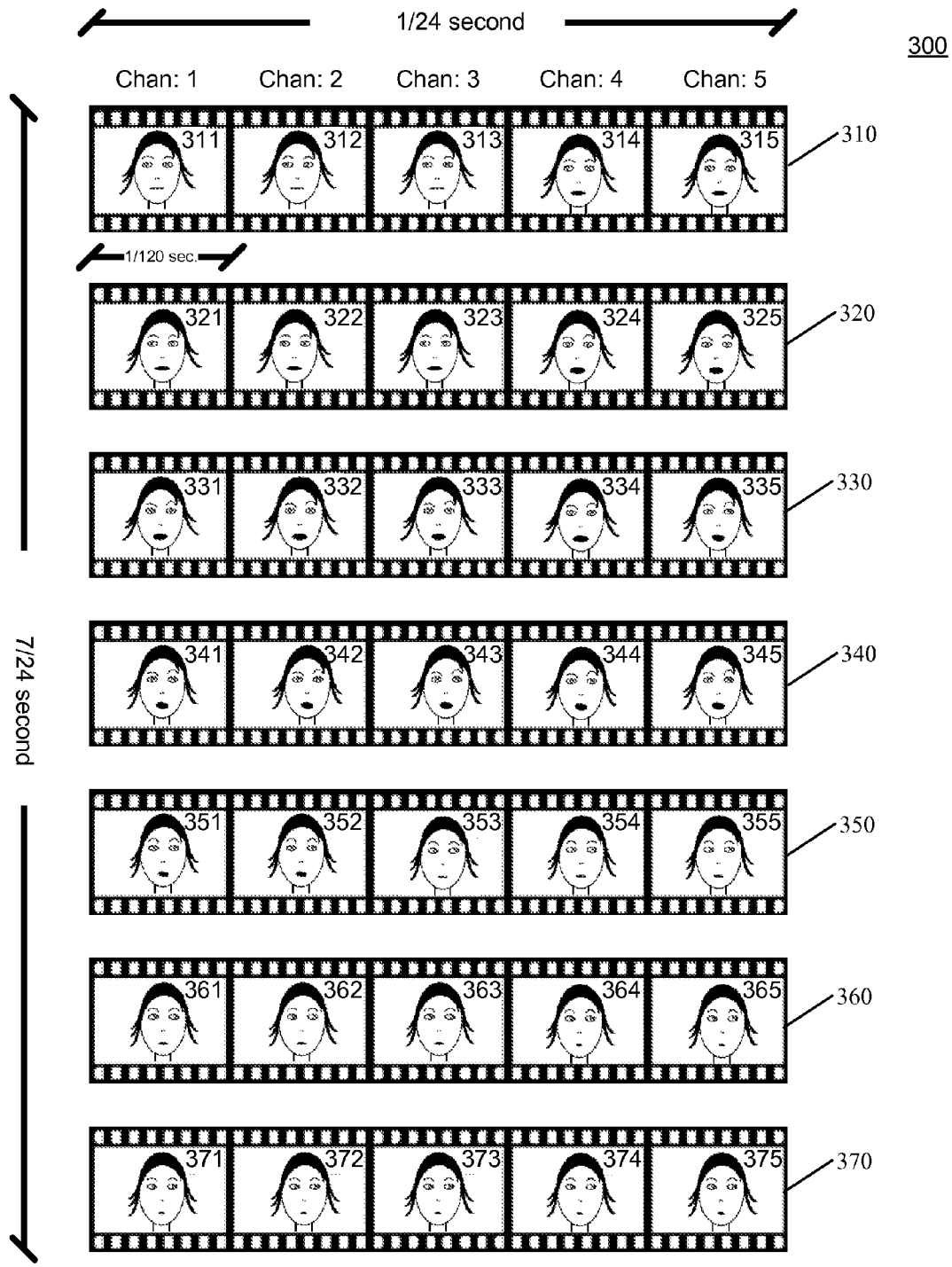
FIG. 3 illustrates frames captured at a high frame rate by a camera in accordance with one embodiment of the present invention.

FIG. 3 is a simplified diagram of a frame capture process according to an embodiment of the present invention. FIG. 3 shows a snapshot of captured frames 300. It is understood that many more frames would be captured in a typical shoot, and captured frames 300 are shown for illustration purposes. The frames are captured in a contiguous fashion, starting from the top left frame (311) and moving to the right and then onto the following row, and so on.

Frames are captured at a high frame rate. For the purposes of illustration, frames 300 are captured at 120 fps in this example. Therefore, every $\frac{1}{120}$ of a second the camera captures an image (frame) of the subject and the subject's surroundings. For example, frame 311 is the first captured frame; frame 312 is the second captured frame; frame 313 is the third captured frame; frame 314 is the fourth captured frame; frame 315 is the fifth captured frame; and frame 321 is the sixth captured frame.

A controller modulates the light channels such that a light source corresponding to light channel 1 exposes frame 311, a light source corresponding to light channel 2 exposes frame 312, a light source corresponding to light channel 3 exposes frame 313, a light source corresponding to light channel 4 exposes frame 314, and a light source corresponding to light channel 5 exposes frame 315. Frames 311-315 make up a frame light sequence cycle 310 with a frame corresponding to each of the light channels.

The controller continues this cycle of modulating the light channels such that a second frame light sequence cycle 320 is captured by the camera. The second frame light sequence cycle includes frame 321 which is exposed by light channel 1, frame 322 which is exposed by light channel 2, frame 323 which is exposed by light channel 3, frame 324 which is exposed by light channel 4, and frame 325 which is exposed by light channel 5. The process can continue as necessary to capture the footage desired by the DP.

As shown, captured frames 300 include a series of frame light sequence cycles (310, 320, 330, 340, 350, 360, and 370). Each of the frame light sequence cycles includes a frame exposed with a light source corresponding to each of the light channels. Therefore, each of frames 311, 321, 331, 341, 351, 361, and 371 is exposed by light sources corresponding to light channel 1. Likewise, each of frames 312, 322, 332, 342, 352, 362, and 372 is exposed by light sources corresponding to light channel 2. The same holds true for the other light channels. Light channel three exposes each of frames 313, 323, 333, 343, 353, 363, and 373; light channel four exposes each of frames 314, 324, 334, 344, 354, 364, and 374; and light channel five exposes each of frames 315, 325, 335, 345, 355, 365, and 375.

As illustrated, the subject has changed her facial expression from frame 311 to frame 321. For example, it appears that the subject is opening her mouth to speak in the 1/24 second between frames 311 and 321. More specifically, it appears that the subject changes her expression between frames 313 and 314. Some frames 311-313 and frames 314-323, for example, are illustrated as being identical, or nearly identical. However, it is understood that, for example, frame 311 could be different from 312 since the frames are taken 1/120 second apart (e.g., if the subject moved between frames 311 and 312). Even if the subject is moving or if other factors affect the exposure of the frame, it is expected that, as the capture frame rate increases, the difference between adjacent captured frames will be smaller. That is, if the capture frame rate was 5,000 fps (instead of the 120 fps example), then the differences between two adjacent frames—in most circumstances—would likely be very small.

Increasing the capture frame rate (e.g., to 240 fps or 5,000 fps) can have one or more of the following benefits. With an increased frame, the number of light channels that are captured can be increased. For example, with a capture frame rate of 240 fps, instead of 120 fps, ten channels of light could be captured (twice as many light channels as when rolling at 120 fps). With an increase frame rate, visible "flicker" on set may be reduced since the light sources may switch on and off more rapidly.

Additionally, with an increased frame rate without increasing the number of light channels, adjacent consecutive frames would be more similar (less change between any two frames) and, therefore, less processing would be required post-production by the compositing software running optical flow algorithms when merging contributions together. For example, with a capture frame rate of 240 fps and when there are 5 light channels, during any given frame light sequence cycle, two frames would be exposed with a light source corresponding to channels 1, 2, 3, 4, and 5, respectively. The optical flow algorithm would then have 2 different frames to use in the compositing process for each light channel.

III. Dynamic Light Selection and Editing

Figure 4:
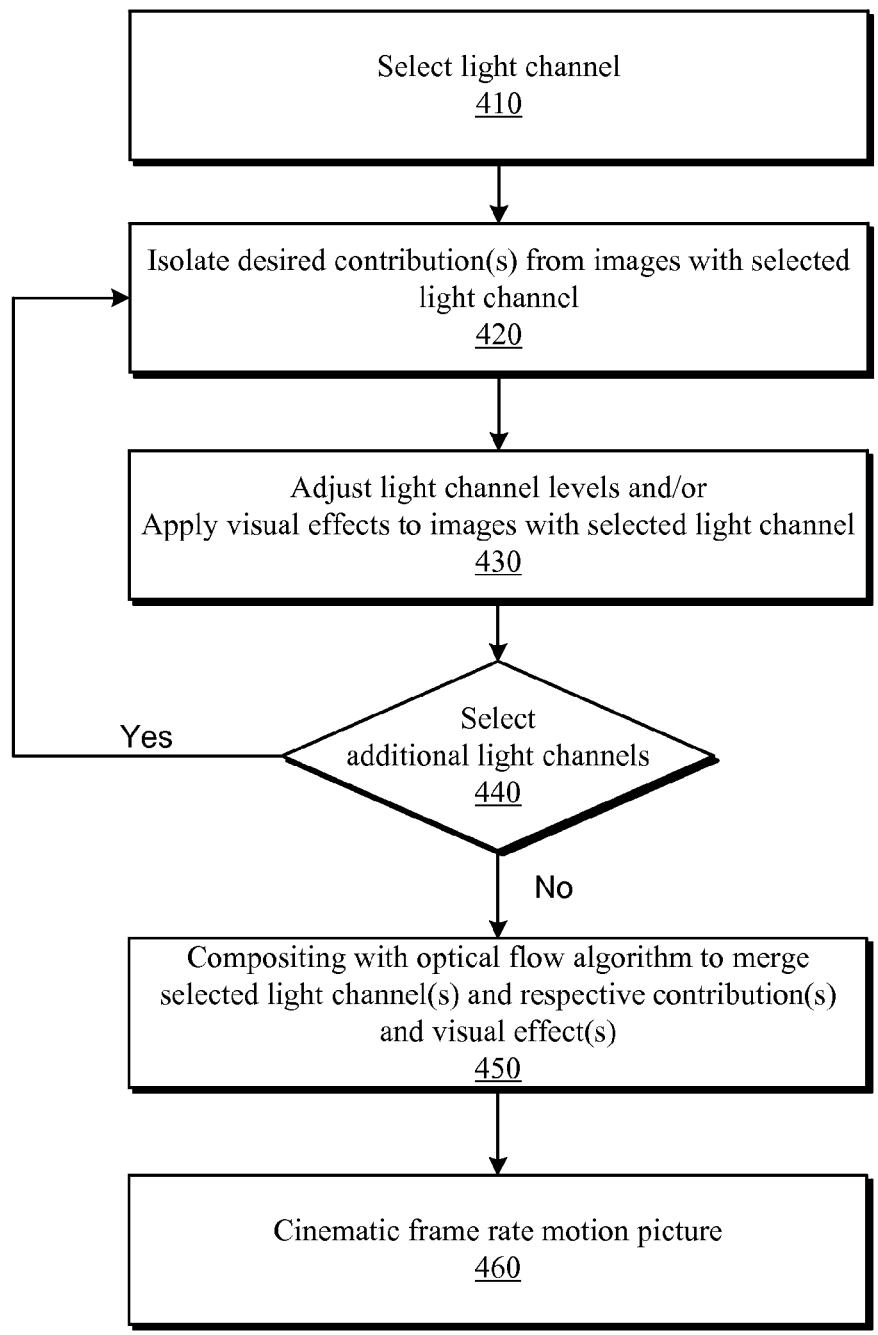
FIG. 4 illustrates a high-level process for selecting and combining light contributions and other effects in accordance with an embodiment of the present invention.
Figure 5:
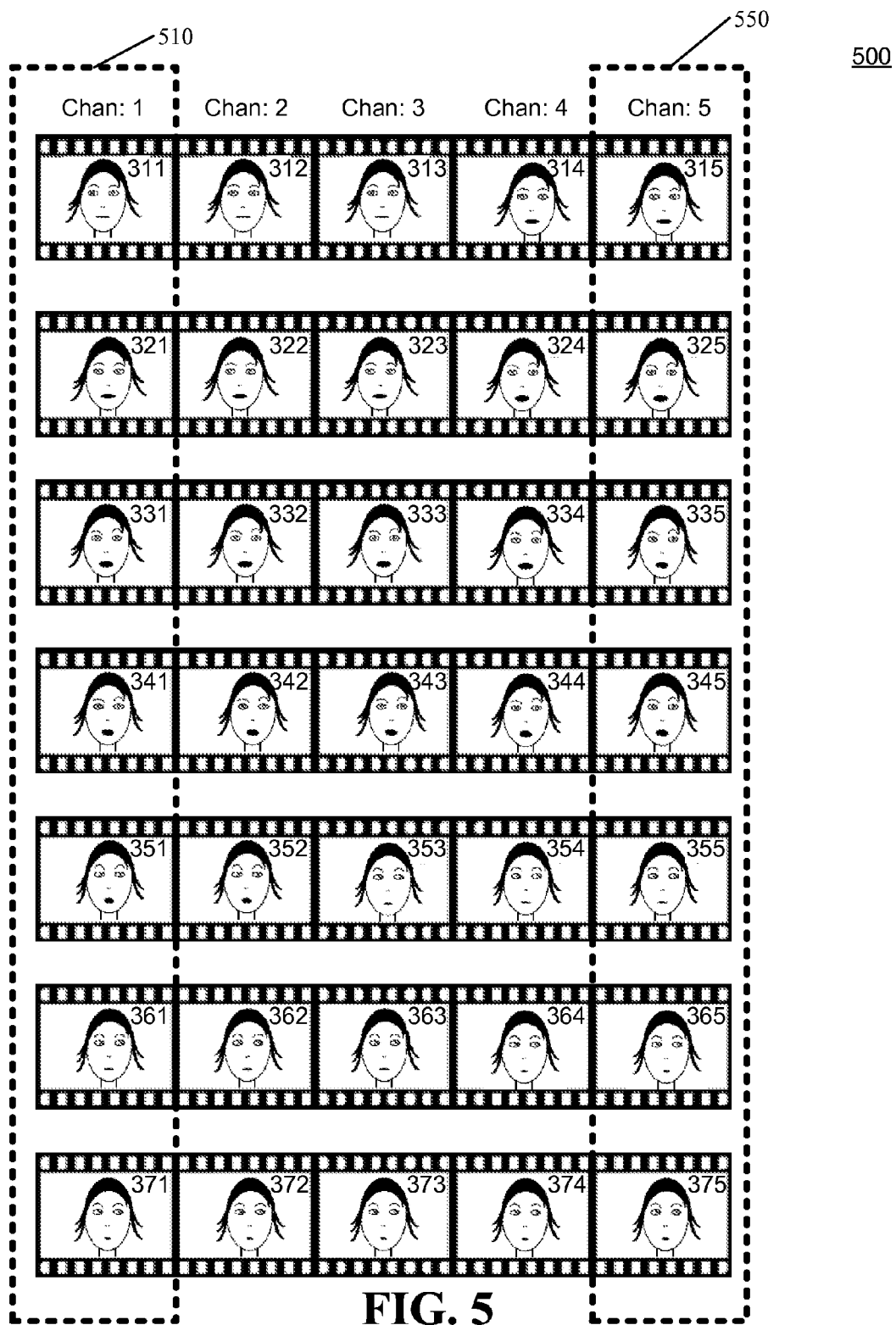
FIG. 5 illustrates a selection technique for frames captured at a high frame rate by a camera in accordance with one embodiment of the present invention.

FIG. 4 shows a high-level flow diagram for a method 400 of dynamic light selection and editing from high frame rate footage. FIG. 5 shows captured frames 500. Reference will be made to the captured frames 500 in FIG. 5 when describing method 400 in FIG. 4.

At block 410, a light channel is selected. As described above, each of the light channels illuminates the subject and set with a different light source. Each of the light sources can have desirable and undesirable aspects of the lighting they produce. The light channels can be analyzed independent of the other light channels and selected for further processing. For example, the DP may like the light source from light channel 1 and desire to manipulate the channel 1 light. Referring to FIG. 5, light channel 1 is selected in this example (510).

At block 420, desired contributions from the frames exposed with the selected light channels can be identified. For example, the DP might like the direction and shadows cast by the light but dislike the color of the light. For instance, the DP might want the color of the light to be a warmer color than the light currently is. The DP may also like the qualities of the light but want it to less dominant in the final picture when compared to the lights in the other channels. Therefore, the DP can modify the intensity of that particular channel to produce this desired effect in the final frame.

At block 430, processing can be performed on the images produced with the selected light channel. In some embodiments, light levels can be adjusted. For example, the light intensity can be changed. In another example, the color of the light can be changed. In some embodiments, visual effects can be applied to the frames. Any number of visual effects can be applied. Visual effects can refer to the various processes by which imagery is created and/or manipulated outside the context of a live action shoot. Visual effects can involve the integration of live-action footage and generated imagery.

This process can be repeated for other light channels that have contributions to the final frame that the DP would like to include in the final shot. For example, the DP can mix and match light characteristics from each of the five light channels. At block 440, additional light channels can be selected, in which case the process repeats through blocks 420 and 430. For example, the DP might like a characteristic of the light produced by the channel 5 light source. Referring to FIG. 5, light channel 5 (550) can be selected. The desired contributions from the selected channel light (channel 5) can be retained and undesired contributions from the selected light channel can be modified (blocks 420). As previously described, additional processing can be performed on the images produced with the selected light channel (at block 430). For example, the DP might like the color of the light, but dislike the intensity of the light. The intensity of light channel 5 can be adjusted.

At block 450, an optical flow algorithm merges images from all the channels—modified at blocks 420-430—into a single final frame to be played back at a cinematic frame rate. An optical flow algorithm can be used to stitch together frames, compensating for the fact that there may be slight differences within the frames captured for each of the 5 channels due to changes in the frames (e.g., a subject moving within the frame), to produce a final sharp image. Referring to the simplified example described above, an optical flow algorithm can stitch together the desired characteristics from frames from light channel 1 (510 in FIG. 5) with frames from light channel 5 (550 in FIG. 5) to produce a frame for playback at a cinematic frame rate (460). In this example the contribution of channel 2, channel 3, and channel 4 is zero. The compositing and optical flow process is described in more detail with respect to FIG. 6, below.

FIG. 5 shows a diagram of a selection and editing technique. After frames 500 (similar to frames 300 in FIG. 3) are captured by a camera, the DP can select desired lighting by choosing one or more light channels. Light levels can be adjusted for any given light channel. The color or intensity may be modified. Visual effects or filters may also be applied to the captured frames from any given light channel. For example, for any light channels, the DP can change the color or intensity and/or apply visual effects to achieve particular aesthetic. The selection and editing shown in FIG. 5 can occur in post-production after the shoot has been completed. In some embodiments, light levels can be adjusted and effects can be added to various light channels on the fly during the shot, using a workstation on set.

In one example, the facial lighting from channel 1 is desirable, and the DP would like to increase the intensity of the light in channel one to more clearly define the face of the subject. For example, the DP might want to see the full emotive experience of the subject's facial expressions. This might be done by adjusting the intensity of all the channels to produce a more flatly lighted scene so that the subject's face can be clearly seen. In another example, the DP might want the scene to have a "noir look" where the scene is more hard lit rather than soft lit. Embodiments of the present invention can allow for changing the lighting of a scene in post-production. For example, by choosing different combinations of light channels and/or effects applied to those light channels, the DP is able to adjust the lighting in post. In the example above, the DP has the ability in post-production to change from a soft lit scene to a hard lit scene.

Using conventional techniques, changing the lighting of a scene in post-production is difficult, time-consuming, and expensive. One of the problems of conventional filming is that two separate shoots would have been used to capture the two lighting scenario examples above (hard and soft light). Embodiments of the present invention allow multiple light channels to be captured during a single shoot allowing one to produce both of the lighting scenarios above with only a single shoot.

Another problem with conventional filming is that once a scene is shot, it is difficult to go back and modify discrete elements of the frames. For example, if a scene was shot with a lamppost prop and in post-production the DP wanted the light on the lamppost to be warmer, a Color Timer (i.e., a person on a film production responsible for the final color grading of the film) cannot easily make the light warmer. Using conventional techniques, the Color Timer would have to do a lot of image processing in order to isolate the contribution of light from the lamppost that was desired from that frame, since the frame contains all the contributions of light present in the scene. Where, in the example above, if the lamppost's light is in a separate light channel, that light channel's lighting contribution to the final frame can easily be modified without having to be concerned with other light sources in the scene.

In some embodiments of the present invention, to achieve the desired output, captured frames with 1 lighting channel could be selected. As shown in FIG. 5, frames 311, 321, 331, 341, 351, 361, and 371 are selected (510) for inclusion of their respective contributions in the final frame. In some embodiments, lighting from multiple channels can combined together to be used to achieve the desired lighting.

Additionally, in some embodiments, specific contributions from the frames with the selected light channel can be isolated for inclusion in the final frames and/or removed so that they are not included in the final frame. In this example, the DP likes the facial lighting for channel 1 frames, but the DP might not like other lighting. The channel contributions that the DP does not like can be removed and therefore not included in the final playback frames.

Continuing with the same example, the background lighting from channel 5 is desirable, and the DP would like to use the channel 5 background lighting. Captured frames 315, 325, 335, 345, 355, 365, and 375 are selected (550) for inclusion of their respective one or more contributions in the final frame. Again, other contributions from other channels that are not wanted can be removed so that they are not included in the final frames.

Selecting channel 1 (510) for its facial lighting qualities and channel 5 (550) for its background light qualities, as well as not including contributions from the other channels, is just one (simplified) example of the options that is available to the DP. One having skill in the art will appreciate that the DP could mix-and-match any number of light channels (e.g., five light channels in FIG. 5) and the various contributions from those channels can be applied to the final frames to produce the desired cinematic output. For example, some combination of the fill light from channel 4 (140 in FIG. 1) and the fill light from channel 5 (150 in FIG. 1) might be desired, while all other light channels are not included.

Any suitable filter or effect can be applied to frames from any given light channel before they are merged into the final playback frames. For example, one light channel may be used to simulate the sun (e.g., because the shoot is indoors). A special effect or other image processing may be applied to the light from that channel to achieve the desired output (e.g., sparkles, lens flares, or the like). Many other effects could be applied, including blurring algorithms, sharpening algorithms, lenses flares, etc. Effects could be applied to any of the available light channels using an image processing algorithm.

IV. Optical Flow

Figure 6:
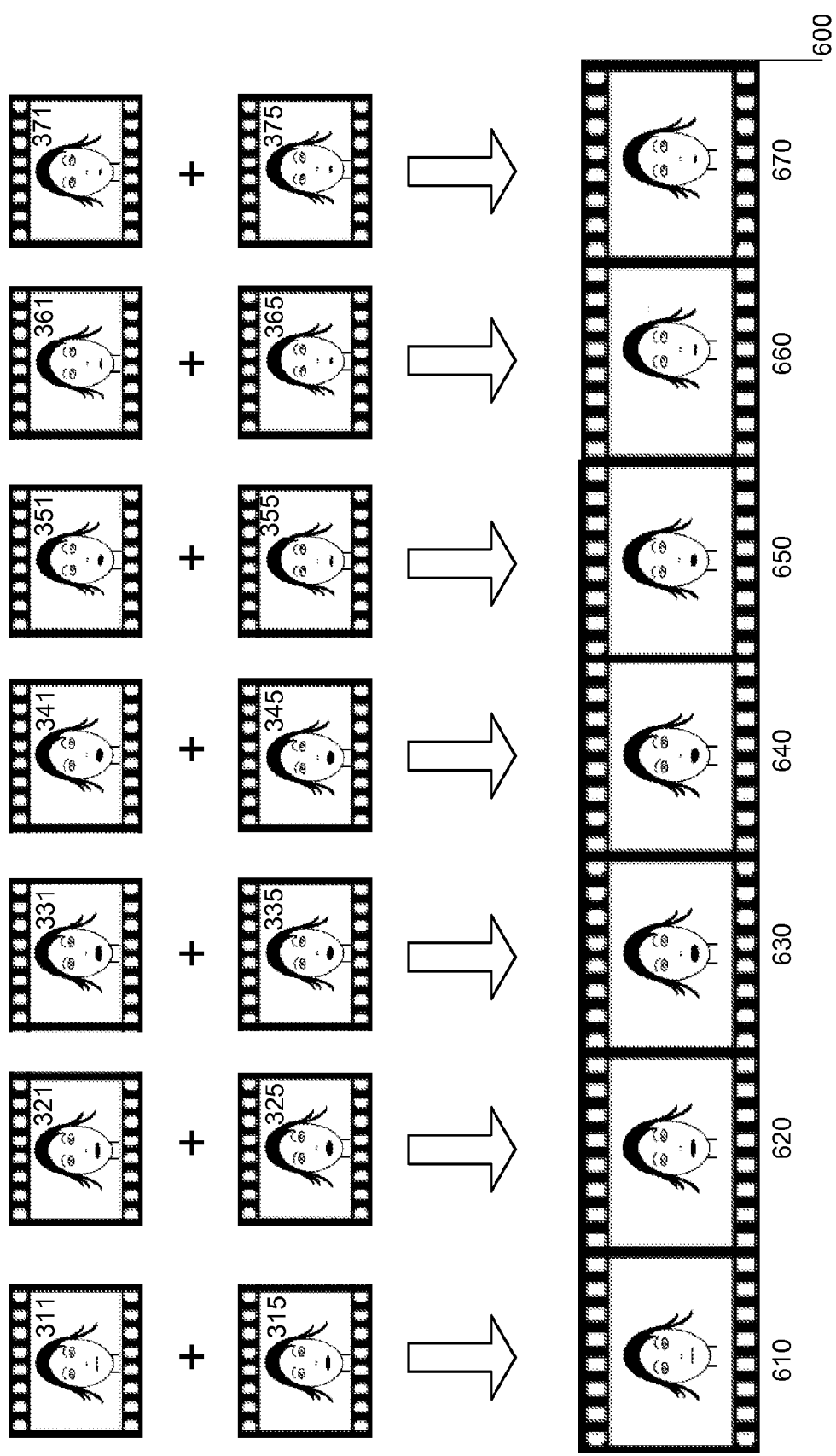
FIG. 6 illustrates an optical flow technique in accordance with one embodiment of the present invention.

FIG. 6 shows a technique for combining contributions from light channels into a sequence of playback frames 600. The sequence of playback frames includes frames 610, 620, 630, 640, 650, 660, and 670.

As described above, when a subject is moving, there will be differences in the subject's position when comparing nearby frames. For example, frame 311 and frame 315 may be slightly different if the subject moves slowly or very different if the subject moves quickly. The higher the capture frame rate, the less differences there will be between any two nearby frames for a given movement speed of the subject. The light channels will be combined together, using an optical flow system, into a single frame, which will represent the final frame that will be play back at the cinematic playback frame rate (e.g., 24 fps). In instances where the subject moves fast relative to the frame rate, a compositing process may be applied for optical flow. In some embodiments, a commercially available compositing program, such as NUKE by The Foundry, may be used. In some embodiments, a specialized optical flow algorithm for the dynamic lighting disclosed herein may be used.

The illustrated example continues from the example from FIG. 5, where light channel 1 and light channel 5 had a desirable quality for inclusion into the final frames. That is, frames 311 and 315, 321 and 325, 331 and 335, 341 and 345, 351 and 355, and 361 and 365, and 371 and 375 are taken from the same example illustrated in FIGS. 3 and 5. Therefore, a technique for combining the contributions from frames 311 and 315, 321 and 325, 331 and 335, 341 and 345, 351 and 355, and 361 and 365, and 371 and 375 is desired in order to arrive at final frames 610, 620, 630, 640, 650, 660, and 670. To accomplish this, various compositing and optical flow processes are used. An optical flow algorithm takes various frames and merges them into a single frame that is, ideally, crisp and clear and has various visual properties (e.g., contributions) that the DP wants.

Turning to playback frame 610, since the DP liked certain contributions from light channel 1 and other contributions from light channel 5, frame 311 (light channel 1) and frame 315 (light channel 5) can be combined using an optical flow process to arrive at playback frame 610. However, as shown, the subject has moved in the time between when frames 311 and 315 were captured. Therefore, the optical flow process would take frames 311 and 315 (and/or other frames with desired lighting), and the optical flow system would take selected contributions, combine them together, and create a single sharp image (frame 610) which would reflect the contribution of each of one of light channels 1 and 5. In some embodiments, the optical flow system can smooth out differences between frames 311, and 315, for example. In some embodiments, the optical flow system might choose the subject position from one of frames 311 or 315 and/or exclude the subject position from the other of the frames 311 or 315.

Likewise, to arrive at playback frame 620, the optical flow system takes desired contributions from light channel 1 (in frame 321) and combines them with desired contributions from light channel 5 (in frame 325).

The optical flow problem is especially acute during action sequences or other shots where there is a lot of movement. For example, if the subject was twirling a baton, instead of changing her facial expression as shown in FIGS. 3, 5, and 6, then the optical flow system may have to do more processing to arrive at final playback frames.

That is because, in these circumstances, even at 120 fps, frame 1 will be significantly different from frame 5. An optical flow process can take the light contributions on channels 1 through 5 and process different parts of the image in frames 1 and 5, and merge them together into a final frame. The final frame will ideally look clear and sharp, and it will not look double-exposed or have other undesirable artifacts.

For example, if the subject is twirling a baton, the baton position in frame 1 may be 10 degrees different from the baton position in frame 5. An optical flow algorithm might take the baton position from frame 1 and apply the lighting contribution from channel 5 fill light (frame 5) and add that contribution to frame 1 with channel 1 light. Therefore, the final frame might have the baton position from frame 1, the key light of channel 1, and the background lighting from frame 5.

With an increased frame capture rate, it is possible to use less light channels and therefore the optical flow algorithm (and/or any manual editor) would have to do less work to arrive at the final frames. For example, when capturing at 10,000 fps with 10 light channels, there may be only imperceptible movement between frames of the same light channel.

V. Exemplary Computer Systems

Figure 7:
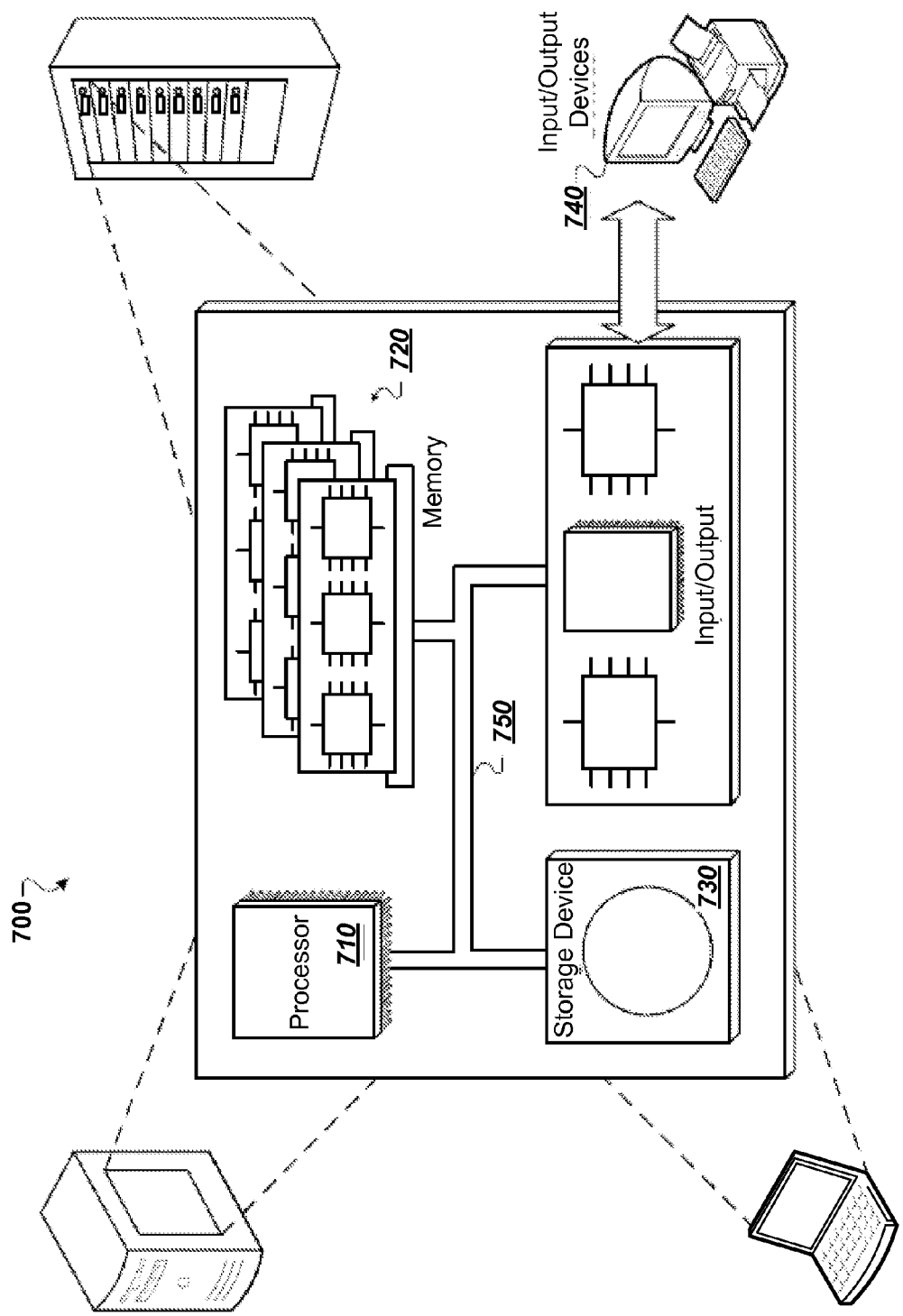
FIG. 7 shows an example of a computer system that may be used in various embodiments of the present invention.

Referring to FIG. 7, a schematic diagram is shown of an example of a computer system 700. This system is exemplary only and one having skill in the art will recognize that variations and modifications are possible. The system 700 can be used for the operations described in association with the flowcharts FIG. 2 and FIG. 4, as well as any of the computer systems shown in FIG. 1. For example, the computer systems shown in FIG. 7 may be used at part of the controller 190, workstation 195, or in capturing or editing any of the frame sequences herein.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700 and may be associated with various characteristics and implementations. For example, the memory 720 may include various types of computer-readable medium such as volatile memory, a non-volatile memory and other types of memory technology, individually or in combination.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modification may be made without departing from the scope of the invention. Accordingly, other embodiments are within the scope of the following claims.

What is claimed is:

1. A method for capturing dynamic light, the method comprising:
    illuminating a subject with a plurality of lights that generate a plurality of light channels, wherein a number of the plurality of light channels is a function of a capture frame rate and a playback frame rate;
    modulating the plurality of light channels as a function of the capture frame rate and the playback frame rate, wherein modulating the plurality of light channels causes only one of the plurality of light channels to illuminate the subject at a given time; and
    capturing a sequence of high frame rate motion picture frames at the capture frame rate, wherein a high frame rate motion picture frame is captured for each of the plurality of light channels.

2. The method of claim 1 further comprising:
    selecting one or more desired contributions from the captured sequence of high frame rate motion picture frames; and
    combining the selected desired contributions into a single frame of a sequence of contiguous finished frames.

3. The method of claim 2, wherein a controller synchronizes a camera and the plurality of light channels.

4. The method of claim 2, wherein the sequence of continuous finished frames is viewable at the playback frame rate.

5. The method of claim 4, wherein the playback frame rate and the number of light channels is a function of the capture frame rate.

6. The method of claim 5, wherein the playback rate is 24 frames per second, the capture frame rate is 120 frames per second, and 5 light channels are used.

7. The method of claim 1 further comprising:
    adjusting characteristics of the captured sequence of high frame rate motion picture frames.

8. The method of claim 3 further comprising:
    adding lighting effects during a filming session based on feedback from one or more monitors coupled to the controller.

9. The method of claim 2, wherein levels associated with each of the plurality of light channels can be adjusted in real-time on a movie set.

10. A motion picture filming system for capturing dynamic light, the system comprising:
    a plurality of light sources to illuminate a subject, wherein the plurality of light sources correspond to a plurality of light channels, and wherein a number of the plurality of light channels is a function of a capture frame rate and a playback frame rate;
    a high frame rate camera for capturing motion picture frames at the capture frame rate; and
    a controller for synchronizing the plurality of light channels and the high frame rate camera as a function of the capture frame rate and the playback frame rate, wherein synchronizing the plurality of light channels causes a high frame rate motion picture frame to be captured for each light channel.

11. The method of claim 10, wherein the sequence of continuous finished frames is viewable at the playback frame rate.

12. The method of claim 11, wherein the playback frame rate and the number of light channels is a function of the capture frame rate.

13. The system of claim 10 further comprising:
    a workstation including a display and an input interface configured to apply lighting effects during a filming session based on feedback displayed on the display.

14. The system of claim 10 further comprising:
    a workstation including a display and an input interface configured to adjust light source levels for the plurality of light sources.

15. The system of claim 10 further comprising:
    a second high frame rate camera, wherein the second high frame rate camera is coupled to the controller and synchronized with light channels.

16. A method comprising:
    obtaining a sequence of high frame rate motion picture frames captured at a capture frame rate, wherein a high frame rate motion picture frame is captured for each of a plurality of light channels, wherein a number of the plurality of light channels is a function of the capture frame rate and a playback frame rate, and wherein the plurality of light channels are modulated as a function of the capture frame rate and the playback frame rate;
    selecting one or more desired contributions from the captured sequence of high frame rate motion picture frames; and
    combining the selected desired contributions into a single frame of a sequence of contiguous finished frames.

17. The method of claim 16 further comprising:
    applying a visual effect to the selected one or more desired contributions from the captured sequence of high frame rate motion picture frames.

18. The method of claim 17, wherein applying the visual effect occurs before combining the selected desired contributions into a single frame of a sequence of contiguous finished frames.

19. The method of claim 16, wherein combining the selected desired contributions into the single frame of the sequence of contiguous finished frames includes applying an optical flow algorithm to the desired contributions.

20. The method of claim 19 further comprising:
adjusting a level of at least one light source before combining the selected desired contributions into the single frame of the sequence of contiguous finished frames.

\* \* \* \* \*